Patented Aug. 18, 1942

2,293,472

UNITED STATES PATENT OFFICE 2,293,472

DISUBSTITUTED CYANAMIDE COMPOUND

Richard O. Roblin, Jr., Stamford, Conn., assignor to American Cyanamid Company, New York, N. Y., a corporation of Maine No Drawing. Application May 23, 1939, Serial No. 275,221

4 Claims. (Cl. 260—551)

This invention relates to new disubstituted cyanamide compounds of the formula—

where R represents an alkyl radical and R' represents an aryl or a substituted aryl radical having a total of more than ten carbon atoms.

These compounds may be generally prepared in an inert solvent such as benzene or petroleum ether fractions by the reaction between the corresponding secondary amine, cyanogen chloride and caustic soda. A preferred equation for this reaction is as follows:

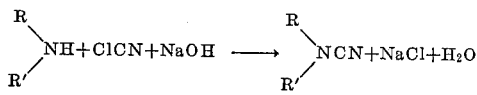

Example I 6.1 grams of cyanogen chloride are dissolved in 100 cc. of benzene. After cooling the solution to 0°–5° C., 16.3 grams of isoamyl phenyl amine are gradually added with stirring. When this addition is completed, the mixture is agitated with a solution of 4 grams of sodium hydroxide dissolved in 20 cc. of water and allowed to stand one hour. The reaction mixture is washed with dilute hydrochloric acid and then with water. The water layer is removed and discarded. The solvent layer is dried with a small amount of anhydrous sodium sulfate. The benzene is removed by distillation under reduced pressure. The residue is vacuum distilled and the product identified as isoamyl phenyl cyanamide.

Example II 6.1 grams of cyanogen chloride are dissolved in 100 cc. of benzene. After cooling the solution to 0°–5° C., 20.5 grams of n-octyl phenyl amine are gradually added with stirring. When this addition is completed, the mixture is agitated with a solution of 4 grams of sodium hydroxide dissolved in 20 cc. of water and allowed to stand one hour. The reaction mixture is washed with dilute hydrochloric acid and then with water. The water layer is removed and discarded. The solvent layer is dried with a small amount of anhydrous sodium sulfate. The benzene is removed by distillation under reduced pressure. The residue is vacuum distilled and the product identified as n-octyl phenyl cyanamide.

Example III 6.1 grams of cyanogen chloride are dissolved in 100 cc. of heptane. After cooling the solution to 0°–5° C., 26.1 grams of n-lauryl phenyl amine are gradually added with stirring. When this addition is completed, the mixture is agitated with a solution of 4 grams of sodium hydroxide dissolved in 20 cc. of water and allowed to stand one hour. The reaction mixture is washed with dilute hydrochloric acid and then with water. The water layer is removed and discarded. The solvent layer is dried with a small amount of anhydrous sodium sulfate. The heptane is removed by distillation under reduced pressure. The residue is vacuum distilled and the product identified as n-lauryl phenyl cyanamide.

Example IV 6.1 grams of cyanogen chloride are dissolved in 100 cc. of heptane. After cooling the solution to 0°–5° C., 16.3 grams of n-butyl-o-tolyl amine are gradually added with stirring. When this addition is completed, the mixture is agitated with a solution of 4 grams of sodium hydroxide dissolved in 20 cc. of water and allowed to stand one hour. The reaction mixture is washed with dilute hydrochloric acid and then with water. The water layer is removed and discarded. The solvent layer is dried with a small amount of anhydrous sodium sulfate. The heptane is removed by distillation under reduced pressure. The residue is vacuum distilled and the product identified as n-butyl-o-tolyl cyanamide.

Example V 6.1 grams of cyanogen chloride are dissolved in 100 cc. of benzene. After cooling the solution to 0°–5° C., 17.1 grams of ethyl-1-naphthyl amine are gradually added with stirring. When this addition is completed, the mixture is agitated with a solution of 4 grams of sodium hydroxide dissolved in 20 cc. of water and allowed to stand one hour. The reaction mixture is washed with dilute hydrochloric acid and then with water. The water layer is removed and discarded. The solvent layer is dried with a small amount of anhydrous sodium sulfate. The benzene is removed by distillation under reduced pressure. The residue is vacuum distilled and the product identified as ethyl-1-naphthyl cyanamide.

Example VI 6.1 grams of cyanogen chloride are dissolved in 100 cc. of heptane. After cooling the solution to 0°–5° C., 21.3 grams of isoamyl-1-naphthyl amine are gradually added with stirring. When this addition is completed, the mixture is agitated with a solution of 4 grams of sodium hydroxide dissolved in 20 cc. of water and allowed to stand one hour. The reaction mixture is washed with dilute hydrochloric acid and then with water. The water layer is removed and discarded. The solvent layer is dried with a small amount of anhydrous sodium sulfate. The heptane is removed by distillation under reduced pressure. The residue is vacuum distilled and the product identified as isoamyl-1-naphthyl cyanamide.

Similarly other disubstituted cyanamides of the above class in both the normal and isomeric forms may be prepared utilizing the corresponding secondary amine.

It is to be understood that the above examples are illustrative only.

These new compounds are adapted for various uses, more particularly as intermediates, insecticides and plasticizers for natural and synthetic resins.

While the invention has been described with particular reference to specific embodiments, it is to be understood that it is not to be limited thereto but is to be construed broadly and restricted solely by the scope of the appended claims.

I claim:

1. As a new compound, a disubstituted cyanamide of the formula—

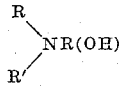

where R is chosen from the group consisting of alkyl radicals having up to twelve carbon atoms and R' is a radical chosen from the group consisting of phenyl, tolyl and naphthyl, the substituent radicals R and R' having a total of from eleven to twenty-two carbon atoms.

2. As a new compound, isoamyl phenyl cyanamide.

3. As a new compound, n-butyl-o-tolyl cyanamide.

4. As a new compound, ethyl-1-naphthyl cyanamide.

RICHARD O. ROBLIN, Jr.

Certificate of Correction

Patent No. 2,293,472. August 18, 1942.

RICHARD O. ROBLIN, JR.

It is hereby certified that error appears in the printed specification requiring correction as follows: Page 2, second column, lines 7 to 10, claim 1, strike out the formula and insert instead the following—

and that the said Letters Patent should be read with this correction therein that the same may conform to the record of the case in the Patent Office.

Signed and sealed this 20th day of October, A. D. 1942.

[SEAL]

HENRY VAN ARSDALE,
*Acting Commissioner of Patents.*